Aug. 5, 1958  K. J. BOGARDUS, SR  2,846,660
CONNECTOR FOR BATTERY POST AND CABLE
Filed Aug. 26, 1957

KING J. BOGARDUS, SR., DECEASED,
*INVENTOR,*
BY MARTHA A. BOGARDUS, EXECUTRIX,

*ATTORNEY* ial post. The present invention relates to battery connectors, 15 lower member and mis-align the perforation in the
United States Patent Office 2,846,660
Patented Aug. 5, 1958

2,846,660

CONNECTOR FOR BATTERY POST AND CABLE

King J. Bogardus, Sr., deceased, late of Litchfield, Conn., by Martha A. Bogardus, executrix, Litchfield, Conn., assignor to King J. Bogardus, Jr.

Application August 26, 1957, Serial No. 680,363

5 Claims. (Cl. 339—225)

The present invention relates to battery connectors, and more particularly to an improvement in means for electrically connecting an electrical cable to the terminal post of a battery, or the like.

It is conventional practice at present to electrically connect the wet cell batteries, carried by automotive vehicles and the like, by providing an electric cable having one end equipped with a split socket of soft metal adapted to grip the sides of a battery terminal post by bolt means carried by the socket. The principal objection to this type of connection lies in the fact that the battery acid corrodes the soft metal socket and bolt means and decomposes the same to such an extent that good electrical conducting contact is no longer possible with this socket. Since the socket is integrally joined to the end of the cable, this means that the entire cable must be replaced. This corroding action sometimes results in the necessity of cutting the socket or bolt to remove the same from a battery terminal post when it is desired to change batteries, thus creating the additional expense of purchasing a new electric cable or cables.

It is therefore the principal object of this invention to provide a battery connector for electrically connecting a terminal post to an electric cable.

A similarly important object of this invention is to provide a device of this class which is formed as a separate unit and which is adapted to fit various sizes of terminal posts and electric cables.

Another object is to provide a device of this class which is formed of hard corrosion resistant metallic electrical conducting material and which may be replaced without replacing the electric cable to which it is connected.

A further object is to provide a connecting means of this class which is small, compact, easy to handle and apply, fits both positive and negative terminal posts, needs no wrenches, no hammer nor no screw driver to pry off, and tightens permanently with pliers.

An additional object is to provide a device of this character which may easily, quickly and efficinetly connect an electric cable to the terminal post of a battery.

A further object of this invention is to provide a connecting means which will provide good electrical contact between an electric cable and a battery terminal post, and which will cause no material damage to the associated parts even when repeatedly and continuously connected and disconnected at the same point.

The present invention accomplishes these and other objects by providing a substantially horizontally disposed lower member having an aperture therethrough adapted to loosely surround a battery terminal post. The sides of the end portion of the lower member opposite the apertured end being turned upwardly to form a substantially U-shaped end portion. The ends of the upwardly turned flanged edges adjacent the aperture are diagonally inclined upwardly toward the end of the U-shaped portion opposite the aperture. A substantially Z-shaped upper member having centrally perforated flanges is superposed on the lower member with the web of the Z-shape in slidable contact with the aligned diagonal end surfaces of the flanged edges disposing one flange of the upper member in spaced co-operative alignment above the aperture of the lower member around the battery terminal post. The other flange of the upper member is disposed in substantially parallel spaced relation above the U-shaped portion of the lower member and is adapted to grip an electric cable in co-operation with the upper edge surfaces of the U-shaped end portion. Bolt means, carried by the bight of the U-shaped end portion and extended through the adjacent flange of the Z-shape, acts to grip an electric cable therebetween and to move the upper member longitudinally with relation to the lower member and mis-align the perforation in the upper member relative to the aperture in the lower member, and thus grip opposing sides of a battery terminal by the camming action of the web of the Z-shape member sliding downwardly on the diagonal end surfaces of the flanged edges of the U-shaped member portion.

Other objects will be apparent from the following description when taken in conjunction with the accompanying single sheet of drawings, wherein.

Like characters of reference designate like parts in those figures of the drawings in which they occur.

In the drawings.

Figure 1:
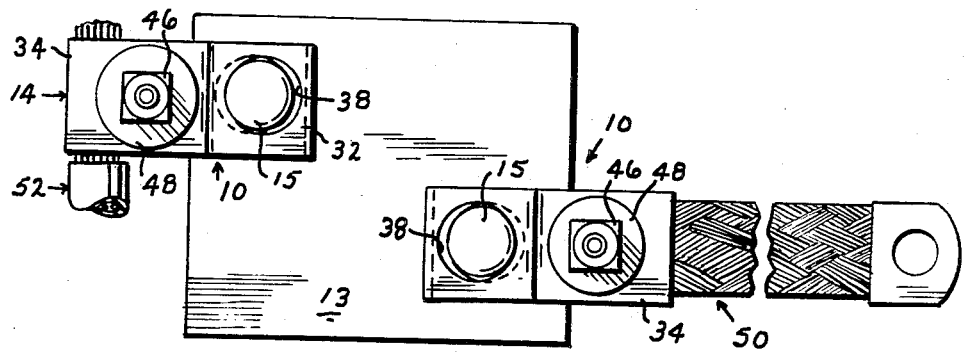
Figure 1 is a fragmentary top plan view of a battery, illustrating two of the devices in operation.

The reference numeral 10 indicates the device, as a whole, comprising a lower member 12 and an upper member 14 installed on a battery 13 having terminal posts 15. The lower member 12 comprises a substantially flat rectangular section of metal having an aperture 16 at one end thereof. The aperture 16 is circular and is preferably substantially larger diametrically than the terminal post 15. Opposing side edges of the lower member 12 are turned upwardly, as at 18 (Fig. 3), forming upwardly disposed flanged edges 20 and 22 to define a U-shaped channel portion extending longitudinally outwardly from the apertured end. The ends of the flanged edges 20 and 22 adjacent the aperture 16 are diagonally cut to form a pair of cam surfaces 24, inclined upwardly toward the end 26 of the U-shaped channel opposite the aperture 16. Adjacent the end 26 the upper edges of the flanged edges 20 and 22 are arcuately slotted, as at 28, in transversely aligned relation, leaving a prong 30 on each of the flanged edges adjacent the end 26, for the purposes more fully disclosed hereinbelow.

The upper member 14 comprises a rectangular section of sheet metal transversely deformed intermediate its ends to define a Z-shaped member having flanged ends 32 and 34 extending outwardly in parallel off-set relation from the central web portion 36. The transverse width of the upper member 14 is substantially equal with relation to the lower member 12. Each of the flanged ends 32 and 34 of the upper member is provided with an enlarged perforation 38 and 40, respectively. Diametrically the perforations 38 and 40 are substantially equal and are of a size to loosely receive a battery terminal post 15 therethrough.

Figures 3, 4:
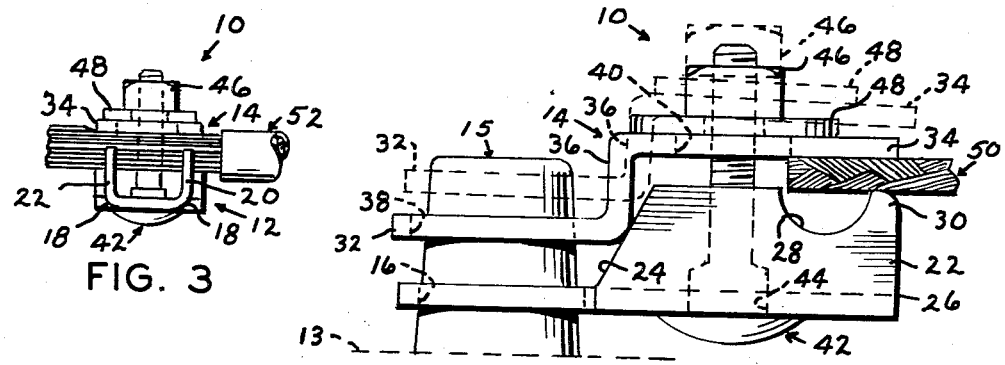
Figure 3 is a detail end view of the device, illustrating the maner in which it clamps a circular electric cable; and, Figure 4 is a fragmentary side elevational view of one of the devices connected to a substantially flat electric cable and illustrating, in dotted lines, the relative positions occupied by the device when connecting a cable to a terminal post.

Referring now more particularly to Fig. 4, the lower member 12 is placed in operative position on a battery terminal post 15 with the aperture 16 surrounding the post. The upper member 14 is longitudinally superposed upon the lower member 12 in substantially the position shown by dotted lines, with the flanged end 32 disposed downwardly and the perforation 38 loosely surrounding the terminal post 15 in substantially vertical alignment with the aperture 16 in the lower member. In this position a portion of the web 36 is in slidable contact with the diagonal ends 24 of the U-shaped channel, thus disposing the remaining flanged end 34 of the upper member in substantially parallel spaced relation above the upper edge surfaces of the U-shaped channel portion. A carriage bolt 42 is extended upwardly through a suitable aperture 44 provided in the bight of the U-shaped channel portion and through the perforation 40 in the flange 34 of the upper member. A nut 46, threadedly carried by the upper end portion of the bolt 42, frictionally contacts the upper surface of the flange 34 by means of a washer 48 interposed therebetween and holds the upper and lower member in assembled relation. One end of an electric cable, in this instance a multiple wired substantially flat woven negative battery cable 50, is interposed between the lower surface of the flanged end 34 of the upper member and the prongs 30 of the lower member. The nut 46 is then manually tightened on the bolt which slides the web 36 downwardly along the inclined surfaces 24 and mis-aligns the perforation 38 in the upper member relative to the aperture 16 in the lower member, thus gripping opposing sides of the terminal post while simultaneously gripping the cable 50 between the flange 34 and the prongs 30, as shown by the solid line position in Fig. 4.

Figure 2:
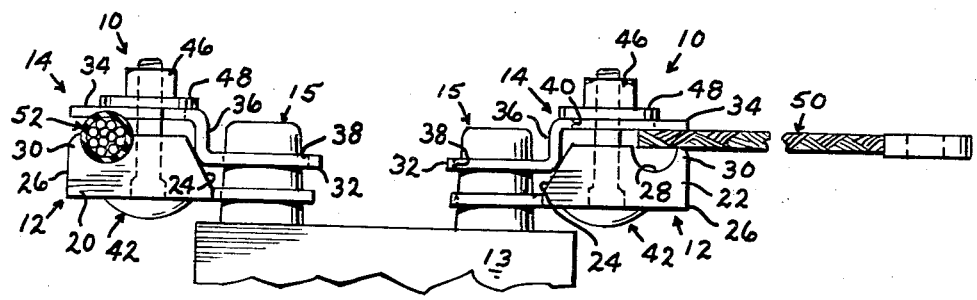
Figure 2 is a fragmentary front elevational view of Fig. 1.

Similarly, a stranded, insulated positive cable 52 may have the insulation removed from one end thereof and longitudinally disposed within the arcuate slots 28, as shown by Figs. 1, 2 and 3, and gripped between the upper member 14 and the lower member 12 when the same are drawn into terminal post gripping relation by the bolt and nut.

The purpose of having the perforations 38 and 40 of the Z-shaped upper member substantially equal, is to permit either of the flanges 32 or 34 to be used for engaging the terminal post 15 as long as the flanged end engaging the post is disposed downwardly with relation to the flange at the opposite end of the upper member, and to permit the bolt 42 to be loosely received by the perforation in the upwardly disposed flanged end of the upper member, so that the upper member is free to slide longitudinally in relation to the lower member when the nut 46 is tightened.

*Operation*

In operation the device is installed, as disclosed hereinabove, for connecting the respective electric cables 50 and 52 to the respective positive and negative terminal post of a battery. When it is necessary to remove or disconnect the battery for any reason, the nut 46 is manually loosened, thus permitting the removal of the device 10, both from the terminal post 15 and the adjacent end of the cable 50 or 52. It seems obvious that this arrangement permits the device 10 to be formed of case hardened electrical conducting corrosion resistant material and that the same may be easily removed from a battery terminal post and cable, and replaced with a new unit 10, without the necessity of replacing the entire cable.

Obviously the invention is susceptible to some change or alteration without defeating its practicability, and we therefore do not wish to be confined to the preferred embodiment shown in the drawings and described herein, further than we are limited by the scope of the appended claims.

What is claimed is:

1. A battery connector for electrically connecting a terminal post to an electric cable, including: a substantially horizontally disposed lower member having an aperture at one end adapted to loosely receive a battery terminal post, the end of said lower member opposite said aperture having upwardly-turned flanged edges forming a U-shaped channel, the ends of said flanged edges adjacent said aperture being inclined upwardly in aligned relation toward the end opposite said aperture; an elongated substantially Z-shaped upper member having an opening through each respective flange of the Z-shape, the length of said upper member being substantially equal with relation to the length of said lower member and superposed on said lower member with one flange of the Z-shape member disposed downwardly and adapted to loosely receive a battery terminal post through the opening therein, the width of said upper member being at least as great as the transverse width of said U-shaped channel, the other flange of said Z-shape member alignedly disposed above the upper edges of said flanged edges in parallel spaced relation and adapted to grip an electric cable in co-operation with said flanged edges, the web of said Z-shaped upper member slidably contacting the inclined ends of said flanged edges; and bolt means carried by the bight of said U-shaped channel and extended through the opening in the adjacent flange of said upper member for biassing said upper member relative to said lower member and simultaneously gripping a battery terminal post and an electric cable.

2. A battery connector for electrically connecting a terminal post to an electric cable, including: a substantially horizontally disposed lower member having an aperture at one end adapted to loosely receive a battery terminal post, the end of said lower member opposite said aperture having upwardly-turned flanged edges forming a U-shaped channel, the ends of said flanged edges adjacent the aperture being diagonally inclined upwardly toward the end opposite the aperture; an elongated substantially Z-shaped upper member superposed on said lower member with one flange of the Z-shape disposed downwardly and centrally perforated and being adapted to loosely surround a battery terminal post in spaced-apart co-operative alignment with the aperture in said lower member, a portion of the web of said Z-shaped upper member slidably contacting the diagonally inclined ends of said flanged edges and disposing the remaining flange of the Z-shaped upper member in substantially parallel spaced relation above the U-shaped channel portion of said lower member; and bolt means carried by the bight of the U-shaped channel and extended through the adjacent flange of said upper member for gripping an electric cable between the U-shaped channel and the adjacent flange of the upper member and biassing said upper member relative to said lower member for mis-aligning the perforation in said upper member relative to the opening in said lower member and gripping opposing sides of the battery terminal post therein, when the bolt means is tightened.

3. A battery connector for electrically connecting a terminal post to an electric cable, including: a substantially horizontally disposed lower member having an aperture adapted to loosely receive a battery terminal post, said lower member formed to describe a U-shaped channel extending outwardly from the aperture, said U-shaped channel having an inclined cam surface adjacent the aperture; an elongated substantially Z-shaped upper member superposed on said lower member with one flange of the Z-shaped member disposed downwardly and being centrally perforated and adapted to loosely surround a battery terminal post in spaced-apart co-operative alignment with the aperture in said lower member, a portion of the web of said Z-shaped upper member slidably contacting the cam surface of said U-shaped channel and disposing the remaining flange of the Z-shaped upper member in co-operative substantailly parallel spaced relation above said U-shaped channel, the upper surface of said U-shaped channel adapted to receive and grip the end portion of an electric cable in co-operation with the adjacent flange of said upper member; and bolt means carried by said U-shaped channel and extended through the adjacent flange of said upper member for gripping an electric cable therebetween, whereby said upper member is moved longitudinally relative to said lower member by the cam surface for misaligning the aperture in said lower member relative to the perforation in said upper member and for gripping opposing sides of a battery terminal post.

4. Structure as specified in claim 3, in which the upper surface of said U-shaped channel is arcuately slotted transversely in aligned relation for receiving a circular electric cable therein.

5. Structure as specified in claim 4, and a pair of prongs formed on the upper surface of said U-shaped channel at the end opposite said cam surface, for gripping a substantially flat electric cable in co-operation with said upper member.

No references cited.